United States Patent Office 3,564,056
Patented Feb. 16, 1971

3,564,056
ETHERS CONTAINING DIFLUORAMINO GROUPS
Lawrence J. Engel, Dunellen, and Michael H. Gianni, Roselle, N.J., and Abraham A. Zimmerman, New York, N.Y., assignors to Esso Research and Engineering Company, a corporation of Delaware
No Drawing. Filed June 5, 1964, Ser. No. 373,143
Int. Cl. C07c 93/02
U.S. Cl. 260—584                    7 Claims This invention relates to a novel kind of energetic oxidizer characterized by derivatives of $NF_2$-substituted alkanols and alkane diols which have tris(difluoramino)-methoxy groups, $-OC(NF_2)_3$, replacing hydoxyl groups so as to form the novel oxidizers which are more potent.

The present invention makes available a number of new compounds which contain more than one energetic difluoramino group per carbon atom and with adequate stability for safe preparation, isolation, and for use in compounding with other components of solid rocket propellants of satisfactory impulse.

Synthesis of the more potent oxidizers with an increased ratio of $NF_2$ groups to carbon atoms necessitates the preparation of $NF_2$-substituted alkanols and alkane diols which themselves are energetic oxidizers and which must serve as suitable precursors.

The synthesis of the novel energetic oxidizers involves reacting perfluoroguanidine with the $NF_2$-substituted alcohols to replace the OH groups by the $-OC(NF_2)NFH$ function and fluorinating the resulting intermediate product so that said function becomes $-OC(NF_2)_3$.

Representative precursors and their derivatives of increased energy value obtained in accordance with the present invention are as follows:

$m$ being the number of OH groups in the $NF_2$ substituted alcohol used as the precursor. Generally $n$ is 1 to 4 and $m$ is 1 to 2. The alkane nucleus R preferably contains 1 to 4 carbon atoms.

In the preparation of the sought derivatives, certain conditions of reaction were discovered to be important for each kind of alcohol containing $NF_2$ substituents. The basic requirement of the method of preparation is the reaction of these alcohols with the compound known as perfluoroguanidine at proper temperatures with consideration as to solvents and catalysts, and then with fluorine.

The difluoramino-alcohols have to be synthesized and separated properly for use as reactants.

The perfluoroguanidine is prepared by fluorinating a salt of guanidine, e.g., guanidine carbonate, dissolved in distilled water at an adjusted pH, preferably 5 to 6, by adding aqueous HF and fluorinating in accordance with the following equation:

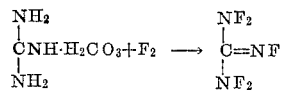

In an efficient preparation of perfluoroguanidine, sodium bifluoride was added to the solution to contain 1 mole guanidine per 1.5 mole $NaHF_2$. The product gases were collected in traps at $-100°$ to $-120°$ C. after which light gaseous impurities were distilled off.

Specific examples of forming the derivatives and the properties of the derivatives are given in the following examples:

| | Precursor | Derivative |
|---|---|---|
| (1) | $CH_2(NF_2)OH$ | $CH_2(NF_2)OC(NF_2)_3$. |
| | Difluoramino methanol | $Tris(NF_2)$methoxy-difluoramino methane. |
| (2) | $CH_2(NF_2)CH(NF_2)CH_2OH$ | $CH_2(NF_2)CH(NF_2)CH_2OC(NF_2)_3$. |
| | 2,3-bis($NF_2$)propanol-1 | 1-tris($NF_2$)methoxy-2,3-bis($NF_2$)propane. |
| (3) | $CH_2(NF_2)CH(NF_2)CH(NF_2)CH(NF_2)CH_2OH$ | $CH_2(NF_2)CH(NF_2)CH(NF_2)CH(NF_2)CH_2OC(NF_2)_3$. |
| | 2,3,4,5-tetrakis($NF_2$)pentanol-1 | 1-tris($NF_2$)methoxy-2,3,4,5-tetrakis($NF_2$)pentane. |
| (4) | $CH_2(NF_2)CH(NF_2)CH(OH)CH(NF_2)CH_2(NF_2)$ | $[CH_2(NF_2)CH(NF_2)]_2CHOC(NF_2)_3$. |
| | 1,2,4,5-tetrakis($NF_2$)pentanol-3 | 3-tris($NF_2$)methoxy-1,2,4,5-tetrakis($NF_2$)pentane. |
| (5) | $CH(NF_2)(OH)CH(NF_2)(OH)$ | $(NF_2)_3COCH(NF_2)CH(NF_2)OC(NF_2)_3$. |
| | 1,2-bis($NF_2$)ethane-diol | 1,2-bis[tris($NF_2$)methoxy]-1,2-bis($NF_2$)ethane. |
| (6) | $CH_2(OH)C(NF_2)_2CH_2(OH)$ | $(NF_2)_3COCH_2C(NF_2)_2CH_2OC(NF_2)_3$. |
| | 2,2-bis($NF_2$)propanediol-1,3 | 1,3-bis[tris($NF_2$)methoxy]-2,2-bis($NF_2$)propane. |
| (7) | $CH_2(OH)[CH(NF_2)]_2CH_2OH$ | $(NF_2)_3OCCH_2[CH(NF_2)]_2CH_2OC(NF_2)_3$. |
| | 2,3-bis($NF_2$)butane-diol | 1,4-bis[tris($NF_2$)methoxy]-2,3-bis($NF_2$)butane. |

The reactions of simple alcohols, such as methanol, butanol, ethylene glycol, butane-1,4 diol and hexane-1,6 diol with perfluoroguanidine and fluorine were found to be tricky, and surprisingly, the alcohols having $NF_2$ groups as in the precursors described did not give the expected difficulty. For example, in the reaction of $CH_3OH$ to obtain $CH_3OC(NF_2)_3$, various unstable products were obtained. These products were decomposed at 60° C. in 60 hours. In reactions of the diols, e.g., $HOCH_2CH_2OH$, and its homologs, it was difficult to react more than one OH group. Under the same conditions used for the reaction of $CH_3OH$, tertiary butyl alcohol could not be reacted. Although the reactions of the alcohols containing $NF_2$ groups were slow, the products obtained were adequately stable.

The representative ($NF_2$)-substituted alcohols and the derivatives obtained in replacing the hydroxyl groups by tris($NF_2$) methoxy groups are denoted by the general formulae:

$$R(NF_2)_n(OH)_m \rightarrow R(NF_2)_n[OC(NF_2)_3]_m$$

wherein R is the $NF_2$-substituted alkane nucleus, $n$ being the number of $NF_2$ groups attached to carbon atoms, and

EXAMPLE 1

Preparation of $CH_2(NF_2)OC(NF_2)_3$

Difluoramino methanol, having the formula $$CH_2(NF_2)OH$$

is made by reacting $HNF_2$ with formaldehyde. The reactants in dry condition are mixed at 0° C. and the reaction mixture is allowed to warm up slowly to ambient temperature. The resulting liquid product is energetic and has to be handled carefully. After separation of the $CH_2(NF_2)OH$ product by distillation, it is reacted slowly with perfluoroguanidine in $CH_3CN$ at room temperature (20° to 25° C.) then with fluorine to obtain the desired derivative having the composition $CH_2(NF_2OC(NF_2)_3$ which is termed difluoramino-tris(difluoramino)methoxy methane and which is identified by properties such as infrared spectrum and nuclear magnetic resonance spectrum. The desired product obtained has $2NF_2/C$.

EXAMPLE 2

1-tris(NF$_2$)methoxy-2,3-bis(NF$_2$)propane

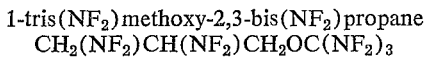

The precursor 2,3-bis(NF$_2$)propanol-1 is made by addition of N$_2$F$_4$ to allyl alcohol.

The replacement of the hydroxyl group in the precursor by the —OC(NF$_2$)NFH function in a reaction of the precursor with perfluoroguanidine goes smoothly at ambient temperatures (20° to 25° C.) to give a 50% yield.

Fluorination of the $$CH_2(NF_2)CH(NF_2)CH_2\text{—}OC(NF_2)NFH$$

product was carried out at 0° C. in CH$_3$CN solvent with 10% F$_2$ in a N$_2$ carrier gas to yield the desired oxidizer. The resulting product has five NF$_2$ groups for four carbon atoms.

EXAMPLE 3

1-tris(NF$_2$)methoxy-2,3,4,5-tetrakis(NF$_2$)pentanol

To obtain the compound 2,3,4,5-tetrakis(NF$_2$)pentanol-1 as the precursor, a preferred method of synthesis carries out the reaction of N$_2$F$_4$ with pentadienyl formate at 125° C. under a pressure of 450 p.s.i.g. using CH$_2$Cl$_2$ as solvent in a mole ratio of 10/6/1 for solvent:N$_2$F$_4$: pentadienyl formate. In a period of 12 hours the desired tetrakis NF$_2$ adduct was obtained predominately. The reaction liquid product is treated with concentrated sulfuric acid to remove unreacted or partly reacted pentadienyl formate and hydrolyze the ester. The solvent is removed by distillation under vacuum to yield a water white liquid which is characterized as having the formula:

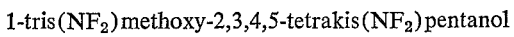

This tetrakis(NF$_2$)pentanol-1 compound can be reacted with perfluoroguanidine to produce

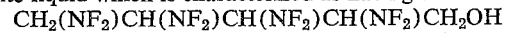

which is fluorinated to

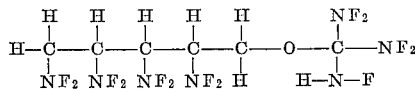

EXAMPLE 4

Preparation of 3-tris(NF$_2$)methoxy-1,2,4,5-tetrakis-(NF$_2$)pentane

The precursor 1,2,4,5,-tetrakis(NF$_2$)pentanol-3 is made by reacting divinyl carbinol (504 mg., 6.0 mmoles) in 5 ml. chloroform containing 50 mg. NaF with N$_2$F$_4$ (16 mmoles) in a glass reactor at reaction temperatures programmed: 1 hour at 50° C., 1 hour at 100° C. and 3 hours at 140° C. (oil bathe temperatures). The total product yield as 983 mg. of which 75% was 1,2,4,5-tetrakis(NF$_2$)pentanol-3 having the confirmed structure:

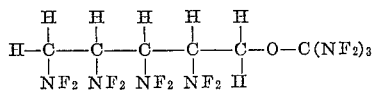

This tetrakis(NF$_2$)pentanol is reacted with C(NF$_2$)NF and F$_2$ to form the 3-tris(NF$_2$)methoxy-1,2,4,5-tetrakis pentane.

EXAMPLE 5

Preparation of bis tris(NF$_2$)methoxy-2,2-bis(NF$_2$)ethane

The precursor 1,2-bis(NF$_2$)ethane-diol-1,2 is made by reacting the reactant difluoramine, HNF$_2$, with vaporized glyoxal, C$_2$H$_2$O$_2$. Measuring 2162 cc. of HNF$_2$ at 22° C. under 15.19 mm. Hg absolute pressure into 27 cc. of the glyoxal at 22° C. under 44.2 mm. Hg absolute condensed into a glass bomb. The mixed reactants in the bomb are warmed to 22° C. and kept at that temperature for 3 hours. Excess HNF$_2$ is removed by distillation and the liquid reaction product is vacuum distilled to recover a high purity product analyzed as having the structural composition:

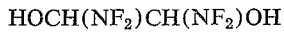

This product has a melting point of 95° C.±1°.

This bis(NF$_2$)ethane diol precursor is reacted with perfluoroguanidine and F$_2$ to produce

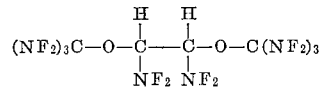

EXAMPLE 6

Preparation of bis[tris(NF$_2$)methoxy]-2,2-bis(NF$_2$) propane

To form the precursor 1,3 - dihydroxy - 2,2 - bis(NF$_2$) propane, first an intermediate is made by reacting 1 g. of 1,3-bis(trifluoroacetoxy)2-propanone with 305 cc. of HNF$_2$ in the presence of 3.78 g. SO$_3$. After 5 hours of reaction at room temperature, excess HNF$_2$ and SO$_3$ were distilled off. The liquid product is poured into ice water and extracted with methylene chloride, the extract is washed with water, then dried over sodium sulfate. After removal of the hydrated sodium sulfate by filtration, the solvent is distilled and the residue was vacuum distilled at 30° to 40° C. at 0.1 mm. Hg absolute. The distillate product recovered was analyzed and found to have the structural composition:

This 1,3-bis(trifluoroacetoxy) - 2,2 - bis(difluoramino) propane product is reacted with excess methanol to replace the trifluoroacetoxy groups by OH groups. The excess methanol and the methyl trifluoroacetate formed are removed by distillation. The residual product under vacuum distillation yields the white crystalline product analyzed as being 1,3-dihydroxy-2,2-bis(NF$_2$)propane.

The precursor, 1,3-dihydroxy-2,2-bis(NF$_2$)propane is reacted with perfluoroguanidine (PFG) under the following conditions: Ambient temperature for 1 to 2 days using a 3/1/10 mole ratio of PFG/diol/CH$_3$CN, and containing a trace amount of catalyst, i.e., NaCN, urea, Et$_3$N. After fluorination, vacuum distillation of the crude product followed by column chromatography on silica gel gave the desired very energetic oxidizer in high purity.

Analysis (percent): C,12.77; N, 22.18; F, 59.9, 59.2. Theory (percent): C, 11.76; N, 21.88; F, 59.4

Thus, it has been demonstrated that the NF$_2$-substituted alcohols can be converted to a new class of compounds having the general formula R(NF$_2$)$_n$[OC(NF$_2$)$_3$]$_m$ described, wherein $n$ is an integer of 1 to 4, $m$ is an integer of 1 to 2 and in which the substituent groups, —NF$_2$ and —OC(NF$_2$)$_3$, are in linkages of the following structures:

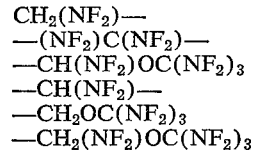

All of the products described contain more than one NF$_2$ group per carbon atom, which makes them useful as oxidizers in rocket propellant systems. Those with a minimum of 1.5 NF$_2$/C are particularly useful to meet high Isp. targets with currently available NF$_2$-containing binders and oxygen-oxidizers that are more easily used, i.e., oxidizers other than nitronium perchlorate. They may also be used with nitronium perchlorate having a protective coating.

The following comparisons show how the presence of —NF$_2$ group substituents in the alkane nucleus in addition to the tris(difluoramino)methoxy group makes the compounds more effective as oxidizers in propellants of increased Isp. values.

F-oxidizer formula:                 Wt. percent $NF_2$ (1) $(NF_2)_3COCH_2CH(NF_2)CH(NF_2)CH_2OC(NF_2)_3$ ---------- 79.07

(2) $(NF_2)_3COCH(NF_2)CH(NF_2)OC(NF_2)_3$ ---------- 83.53

(3) $(NF_2)_3COCH_2C(NF_2)CH_2OC(NF_2)_3$ -- 81.24

[Components, wt. percent]

| F-oxidizer: | O-oxidizer | B | Binder | $I_{sp}$ |
|---|---|---|---|---|
| (1) 20 | (a) 51 | 9 | 20 | 282.1 |
| (2) 20 | (a) 49 | 11 | 20 | 283.2 |
| (1) 50 | (a) 27 | 3 | 20 | 293.8 |
| (2) 50 | (a) 25 | 5 | 20 | 297.5 |
| (3) 30 | (b) 34 | 6 | 30 | 295.0 |

In the table the (a) O-oxidizer is $N_2H_4(HClO_4)_2$, the (b) O-oxidizer is $NO_2ClO_4$ having a 5% coating of a chlorinated polymer having the composition $C_3H_6Cl_2$, the fuel B is boron powder, and the binder is tetrakis($NF_2$) amyl acrylate polymer.

F-oxidizers having $2NF_2/C$ of the present invention permit Isp. values above 300 to be reacted with lithium as the fuel and $NO_2ClO_4$ as the O-oxidizer.

The novel F-oxidizers described are highly energetic and can react to liberate large amounts of heat. They can be used with stabilizing and protective coating substances. They can be used with the known oxygen-oxidizers, metal-containing fuels, and energetic polymeric binders in formulating solid rocket propellants.

The invention described is claimed as follows:

1. A compound having the formula:

$$R(NF_2)_n[OC(NF_2)_3]_m$$

wherein R is an alkane nucleus having an $NF_2$ substituent linked to carbon in the alkane nucleus and an $OC(NF_2)_3$ substituent linked to a carbon atom in said nucleus, $n$ being 1 to 4 and $m$ being 1 to 2.

2. The compound tris($NF_2$)methoxy-difluoramino methane having the formula:

$$CH_2(NF_2)OC(NF_2)_3$$

3. The compound 1-tris($NF_2$)methoxy-2,3-bis($NF_2$) propane having the formula:

$$CH_2(NF_2)CH(NF_2)CH_2OC(NF_2)_3$$

4. The compound 1,2-bis[tris($NF_2$)methoxy]-1,2-bis-($NF_2$)ethane having the formula:

$$(NF_2)_3COCH(NF_2)CH(NF_2)OC(NF_2)_3$$

5. The compound 1,2-bis[tris($NF_2$)methoxy]-2,2-bis-($NF_2$)propane having the formula:

$$(NF_2)_3COCH_2C(NF_2)_2CH_2OC(NF_2)_3$$

6. The compound 3-tris($NF_2$)methoxy-1,2,4,5-tetrakis ($NF_2$)pentane having the formula:

$$[CH_2(NF_2)CH(NF_2)]_2CHOC(NF_2)_3$$

7. The method of producing a compound having a substituted alkane nucleus with —$NF_2$ and —$OC(NF_2)_3$ groups linked to carbon in said nucleus, which comprises reacting an $NF_2$-substituted alcohol of the group consisting of lower difluoroaminoalkanols and lower difluoroaminoalkanediols with perfluoroguanidine to replace the OH groups by —$OC(NF_2)NFH$ functions, then reacting the resulting product with fluorine under low temperature conditions to replace the —$OC(NF_2)NFH$ functions by —$OC(NF_2)_3$ functions with the $NF_2$ groups remaining attached to carbon in the alkane nucleus.

References Cited

Hoffman et al.: Chem. Reviews, vol. 62, pp. 14 and 15 (1962).

LELAND A. SEBASTIAN, Primary Examiner

U.S. Cl. X.R.

149—19, 109; 260—564